United States Patent
Choi et al.

(10) Patent No.: US 7,201,787 B2
(45) Date of Patent: Apr. 10, 2007

(54) AIR CLEANER AND METHOD OF CONTROLLING OPERATION THEREOF

(75) Inventors: Ho Seon Choi, Seoul (KR); Ju-Yeon Lee, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 113 days.

(21) Appl. No.: 10/829,229

(22) Filed: Apr. 22, 2004

(65) Prior Publication Data

US 2005/0055990 A1    Mar. 17, 2005

(30) Foreign Application Priority Data

Sep. 15, 2003  (KR) .................... 10-2003-0063587

(51) Int. Cl.
*B64D 13/00* (2006.01)
(52) U.S. Cl. .................... 55/471; 55/472; 55/473; 55/350.1; 55/385.2; 55/417; 96/226; 96/397; 96/417; 96/423; 454/229; 454/255
(58) Field of Classification Search ........ 555/471–473, 555/385.2, 350.1, 417; 96/226, 397, 417, 96/423; 454/229, 255
See application file for complete search history.

(56) References Cited

U.S. PATENT DOCUMENTS

| | | | | |
|---|---|---|---|---|
| 3,518,046 A * | 6/1970 | Cicirello | ...................... | 96/224 |
| 3,948,732 A * | 4/1976 | Haddad et al. | .......... | 435/293.2 |
| 3,987,133 A * | 10/1976 | Andra | ........................ | 261/130 |
| 4,001,974 A * | 1/1977 | Wright | ....................... | 49/489.1 |
| 4,033,825 A * | 7/1977 | Haddad et al. | .......... | 435/293.2 |
| 4,039,775 A * | 8/1977 | Andra | ......................... | 219/385 |
| 4,109,676 A * | 8/1978 | Price | .......................... | 137/550 |
| 4,116,514 A * | 9/1978 | Lawrence | .................... | 439/31 |
| 4,437,608 A | 3/1984 | Smith | | |
| 4,567,939 A * | 2/1986 | Dumbeck | ................... | 165/224 |
| 4,850,264 A * | 7/1989 | Kiser | ......................... | 454/255 |
| 4,872,397 A * | 10/1989 | Demeter et al. | ............ | 454/229 |
| 5,024,263 A | 6/1991 | Laine et al. | | |
| 5,538,471 A | 7/1996 | Guiles, Jr. et al. | | |
| 5,934,991 A * | 8/1999 | Rush | .......................... | 454/187 |
| 6,361,590 B1 * | 3/2002 | Gilbert et al. | ................ | 96/384 |
| 6,878,177 B2 * | 4/2005 | Lohr et al. | .................. | 55/385.2 |
| 6,929,684 B2 * | 8/2005 | Chang et al. | .................. | 96/226 |

FOREIGN PATENT DOCUMENTS

EP          0 909 926 A1    4/1999

(Continued)

*Primary Examiner*—Minh-Chau T. Pham
(74) *Attorney, Agent, or Firm*—Birch, Stewart, Kolasch & Birch, LLP (57) ABSTRACT

An air cleaner and method of controlling an operation of the same is disclosed. The air cleaner includes a cabinet having an inlet and an outlet; a filter assembly removing dust and smell particles from a room air; a fan; a sensor assembly sensing the composition of the room air; a supplier assembly providing at least one of insufficient components of the room air to a cleaned air; and a controller controlling the supplier assembly on the basis of data regarding the composition of the room air. In another aspect, the method of controlling the operation of the air cleaner includes steps of sensing a room air; measuring insufficient components of the room air and the amount thereof; and providing at least one of the insufficient components of the room air to a cleaned air.

29 Claims, 7 Drawing Sheets

FOREIGN PATENT DOCUMENTS

| | | |
|---|---|---|
| EP | 1 114 970 A | 7/2001 |
| GB | 2 254 447 A | 10/1992 |
| JP | 59 038541 A | 3/1984 |
| JP | 59 205539 A | 11/1984 |
| JP | 07 019574 A | 1/1995 |
| JP | 10 009634 A | 1/1998 |
| KR | 20-0250342 | 11/2001 |
| KR | 2001-0104027 | 11/2001 |
| KR | 2003-0016787 | 3/2003 |

\* cited by examiner

AIR CLEANER AND METHOD OF CONTROLLING OPERATION THEREOF

This application claims the benefit of the Korean Application No. P2003-63587 filed on Sep. 15, 2003, which is hereby incorporated by reference.

BACKGROUND OF THE INVENTION

1. Field of the Invention

The present invention relates to an air cleaner, and more particularly, to an air cleaner and a method of controlling an operation of the same, so as to remove foreign particles from an indoor air, and provide insufficient components of the indoor air, thereby obtaining a comfortable indoor environment with an optimum air state.

2. Discussion of the Related Art

Figure 1:
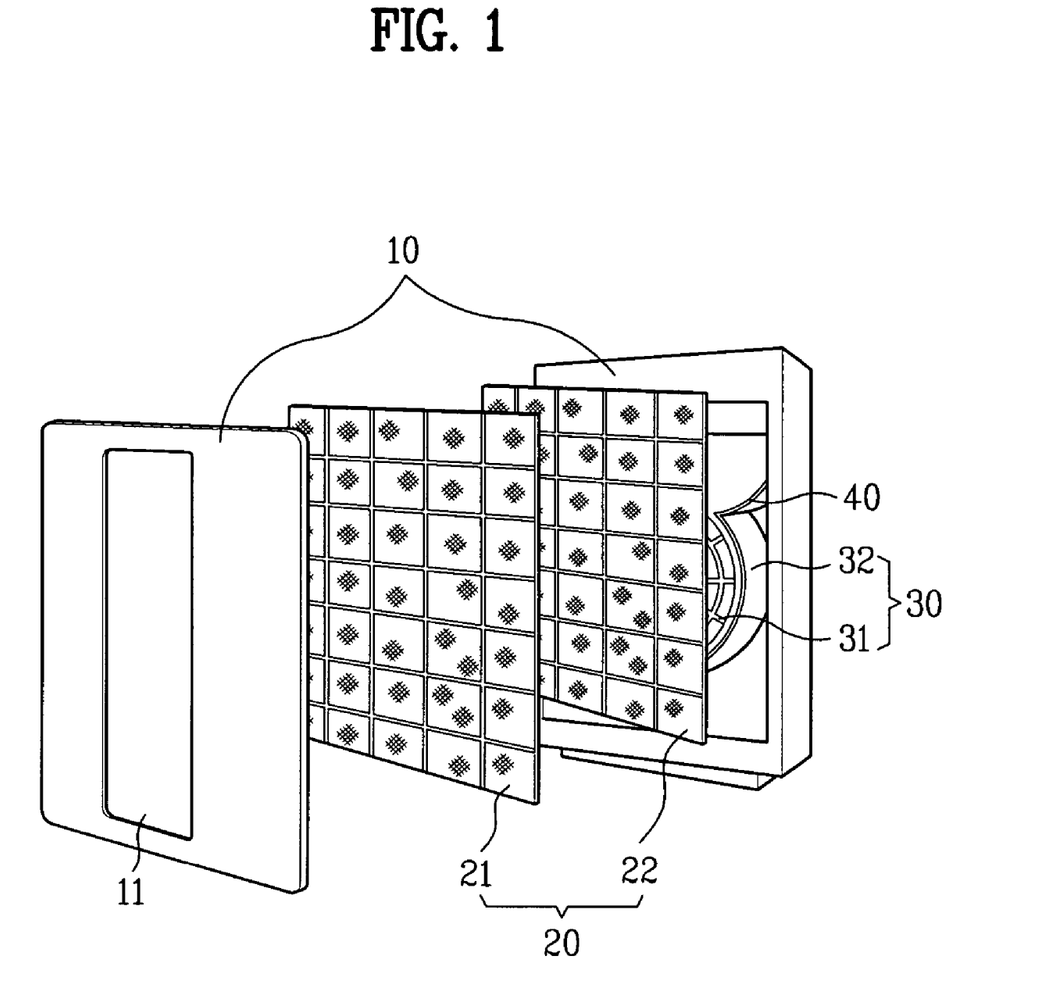
FIG. 1 is an exploded perspective view illustrating a general air cleaner.
Figure 2:
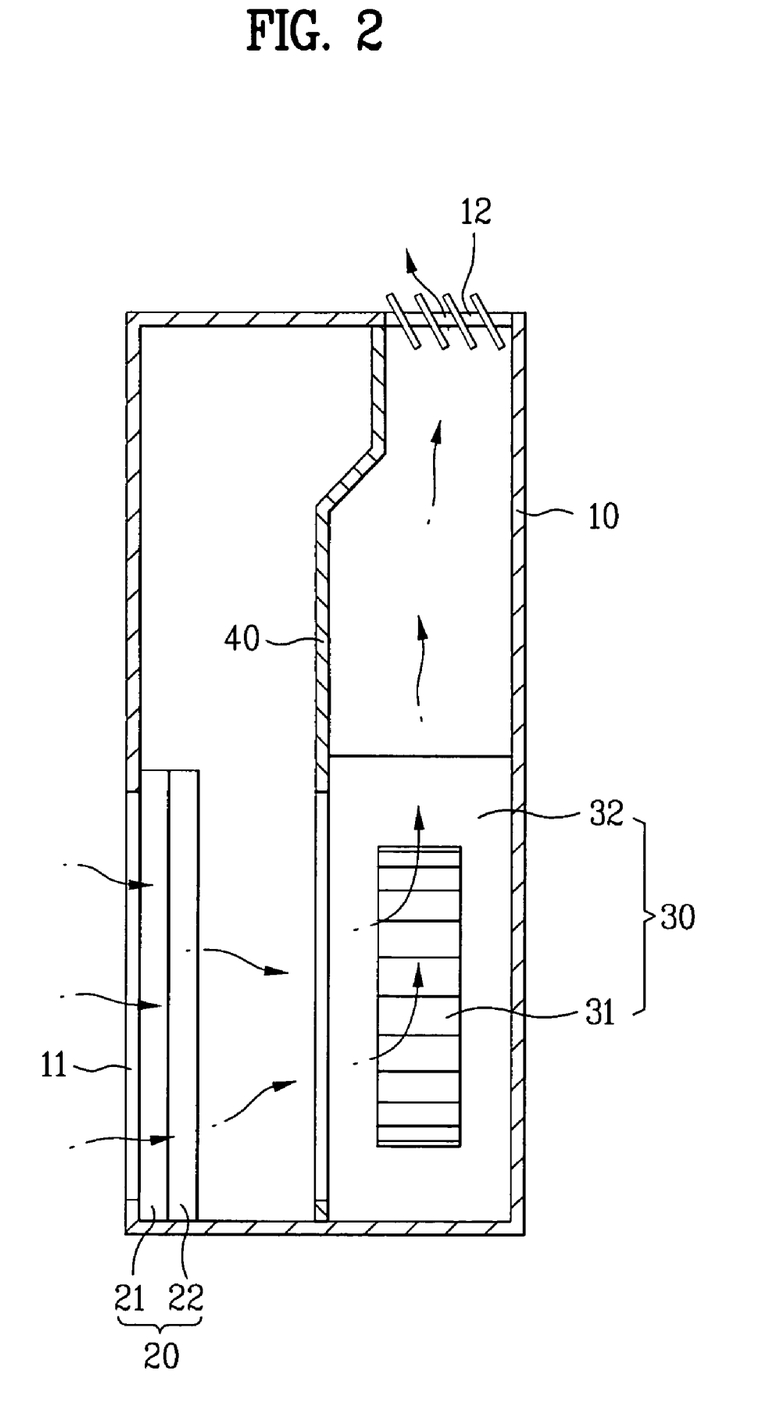
FIG. 2 is a cross-sectional view illustrating a general air cleaner of FIG. 1.

In general, an air cleaner provides a comfortable room environment by carrying out a deodorization function for removing various smells in a room air, and a dust collecting function for removing dust from the room air. FIG. 1 and FIG. 2 illustrate a general air cleaner. Hereinafter, the general air cleaner will be described with reference to the accompanying drawings.

Referring to FIG. 1, the general air cleaner is provided with a cabinet 10, a filter assembly 20, a fan assembly 30, and a guide 40.

At this time, the cabinet 10 is provided with an inlet 11 and an outlet 12. In this state, the room air is drawn into the inside of the cabinet 10 through the inlet 11. For example, the inlet 10 is provided in a lower front part of the cabinet 10. Also, the air cleaned inside the cabinet 10 is discharged to the room through the outlet 12. For example, the outlet 12 is provided in an upper rear part of the cabinet 10.

The filter assembly 20 is provided with a first filter 21 and a second filter 22. The first filter 21 removes the dust from the room air, drawn into the inside of the cabinet 10 through the inlet 11, and the second filter 22 removes smell particles therefrom. At this time, the first filter 21 is provided inside the cabinet 10 near to the inlet 11, and the second filter 22 is provided in the rear of the first filter 21 so as to remove the fine dust or smell particles unfiltered in the first filter 21.

The fan assembly 30 is provided with a fan 31 and a fan housing 32. The fan 31 is provided inside the cabinet 10 between the filter assembly 20 and the outlet 12, and the fan housing 32 is provided to surround the fan 31.

As shown in FIG. 2, the guide 40 is provided inside the cabinet 10 so as to guide the air passing through the fan 31 to the outlet 12.

On operation of the general air cleaner, when the fan 31 is rotated, the room air is drawn into the inside of the cabinet 10 through the inlet 11, and the air passes through the filter assembly 20. At this time, the first filter 21 removes the dust from the air, and the second filter 22 removes the smell particles from the air. After that, the filtered air flows into the fan 31, and is guided to the outlet 12 by the guide 40. Then, the air is discharged to the room.

As mentioned above, the general air cleaner has the following disadvantages.

First, the general air cleaner simply removes the dust and the smell particles from the room air. Accordingly, even though the air filtered and cleaned by the air cleaner is provided to the room, a user may not feel that the room air is cleaned, whereby it is hard to obtain a user's reliability.

Also, the general air cleaner provides the cleaned air having a temperature corresponding to the indoor temperature. Accordingly, in case of that the air discharged from the air cleaner is direct contact with the skin of the user in the winter or summer, the user may feel unpleasant. Thus, in addition to the air cleaner, the user requires an additional air conditioner for cooling or heating the room air.

SUMMARY OF THE INVENTION

Accordingly, the present invention is directed to an air cleaner and a method of controlling an operation of the same using the same that substantially obviates one or more problems due to limitations and disadvantages of the related art.

An object of the present invention is to provide an air cleaner and a method of operating the same, so as to remove foreign particles from an indoor air, and provide insufficient components of the indoor air, thereby obtaining a comfortable indoor environment with an optimum air state.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air cleaner includes a cabinet including an inlet drawing a room air, and an outlet discharging a cleaned air to a room; a filter assembly provided inside the cabinet so as to remove dust and smell particles from the room air drawn through the inlet; a fan provided inside the cabinet so as to discharge the cleaned air to the outlet after drawing the room air; a sensor assembly provided inside the cabinet so as to sense composition of the room air drawn through the inlet; a supplier assembly provided inside the cabinet so as to provide at least one of insufficient components of the room air to the air cleaned by the filter assembly; and a controller controlling the supplier assembly on the basis of data regarding the composition of the room air from the sensor assembly.

At this time, the sensor assembly senses the composition of the room air before the air passes through the filter assembly.

Also, the sensor assembly includes at least one of a first sensor measuring an oxygen content of the room air; a second sensor measuring a temperature inside the room; a third sensor measuring a dust content of the room air; and a fourth sensor measuring a gas content of the room air.

The fourth sensor is provided to measure at least one of carbon monoxide $CO_2$ and nitride oxide $NO_x$.

Furthermore, the sensor assembly includes a fifth sensor measuring the humidity inside the room.

The supplier assembly includes a first supplier providing oxygen to the cleaned air.

The supplier assembly includes a second supplier providing anion to the cleaned air.

The supplier assembly includes a third supplier providing terpene to the cleaned air.

Meanwhile, a cooling/heating device is provided inside the cabinet, so as to cool or heat the cleaned air. The cooling/heating device is provided with a thermoelectric module. At this time, the thermoelectric module includes a first side having an exothermic or endothermic reaction, and being in contact with the cleaned air; and a second side having an opposite reaction to that of the first side, and not being in contact with the cleaned air.

The fan has a variable rotation speed.

In another aspect, a method of controlling an operation of an air cleaner includes steps of sensing a room air drawn into the inside of a cabinet through an inlet; measuring insufficient components of the room air and the amount thereof by comparing the sensed data with previously inputted data; and providing at least one of the insufficient components of the room air to the air cleaned by a filter assembly and guided to an outlet by a fan.

At this time, at least one of oxygen and anion is provided to the air cleaned by the filter assembly and guided to the outlet by the fan.

Furthermore, the method of controlling the operation of the air cleaner includes the step of providing terpene to the air cleaned by the filter assembly and guided to the outlet by the fan.

Furthermore, the method of controlling the operation of the air cleaner includes the steps of calculating at least one of a dust content and a gas content of the room air on the basis of the sensed data; and controlling a rotation speed of the fan on the basis of at least one of the dust content and the gas content.

At this time, the fan has a variable rotation speed including a high speed when the dust or gas content of the room air is above the previously inputted range; a normal speed when the dust or gas content of the room air is within the previously inputted range; and a low speed when the dust or gas content of the room air is below the previously inputted range.

Furthermore, the method of controlling the operation of the air cleaner includes the steps detecting that a temperature of the room air is within a summer season temperature range or a winter season temperature range on the basis of the previously inputted data; and cooling or heating the air cleaned and guided to the outlet on the basis of the detected season.

In this case, if it is detected that the room air has a temperature corresponding to a summer season, the cleaned air, having a temperature lower than the temperature of the room air at a range between 1° C. and 3° C., is provided to an indoor room.

Also, if it is detected that the room air has a temperature corresponding to a winter season, the cleaned air, having a temperature higher than the temperature of the room air at a range between 1° C. and 3° C., is provided to an indoor room.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an air cleaner according to the present invention will be described as follows.

Figure 3:
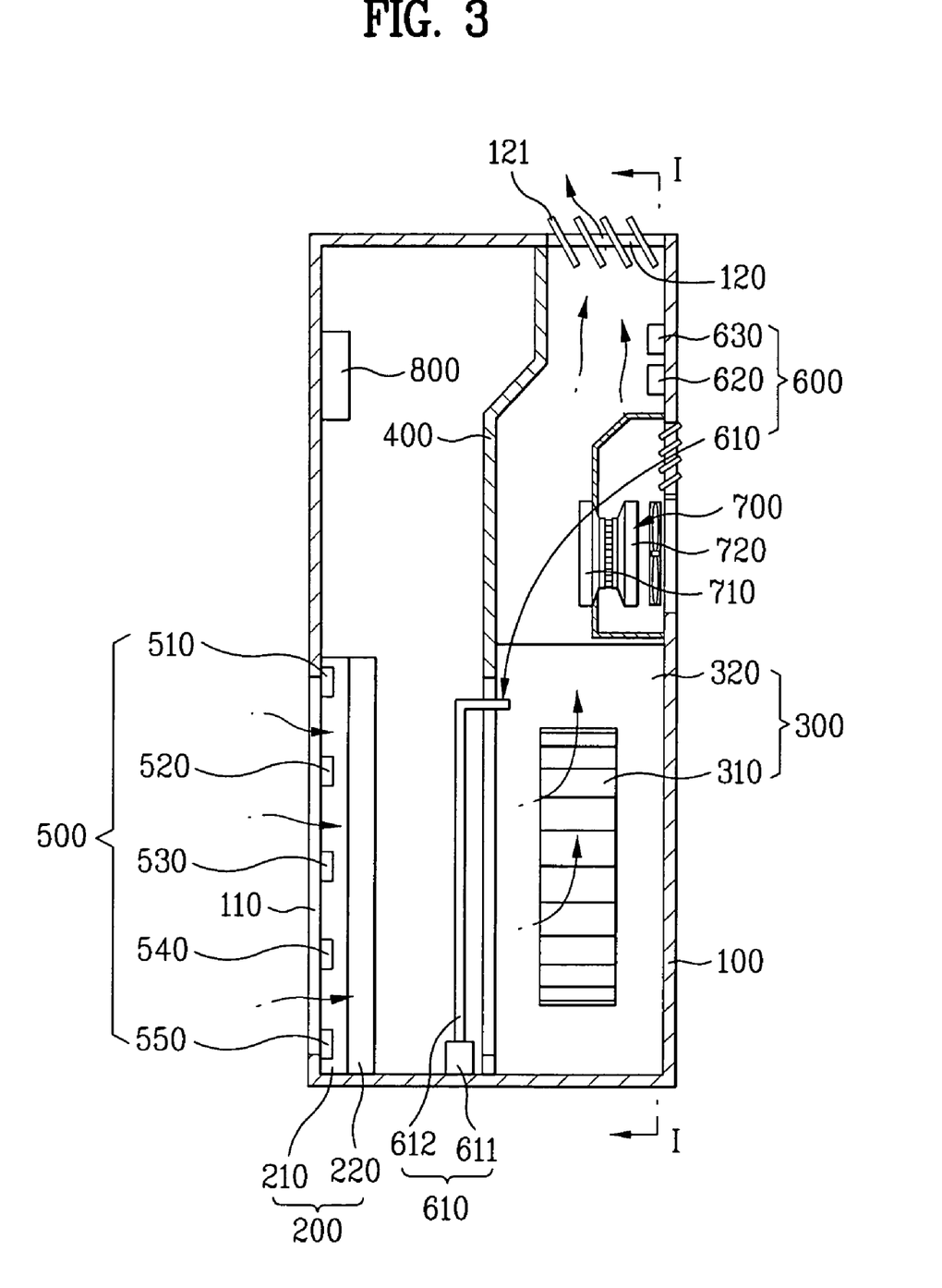
FIG. 3 is a cross-sectional view illustrating an air cleaner according to the present invention.
Figure 4:
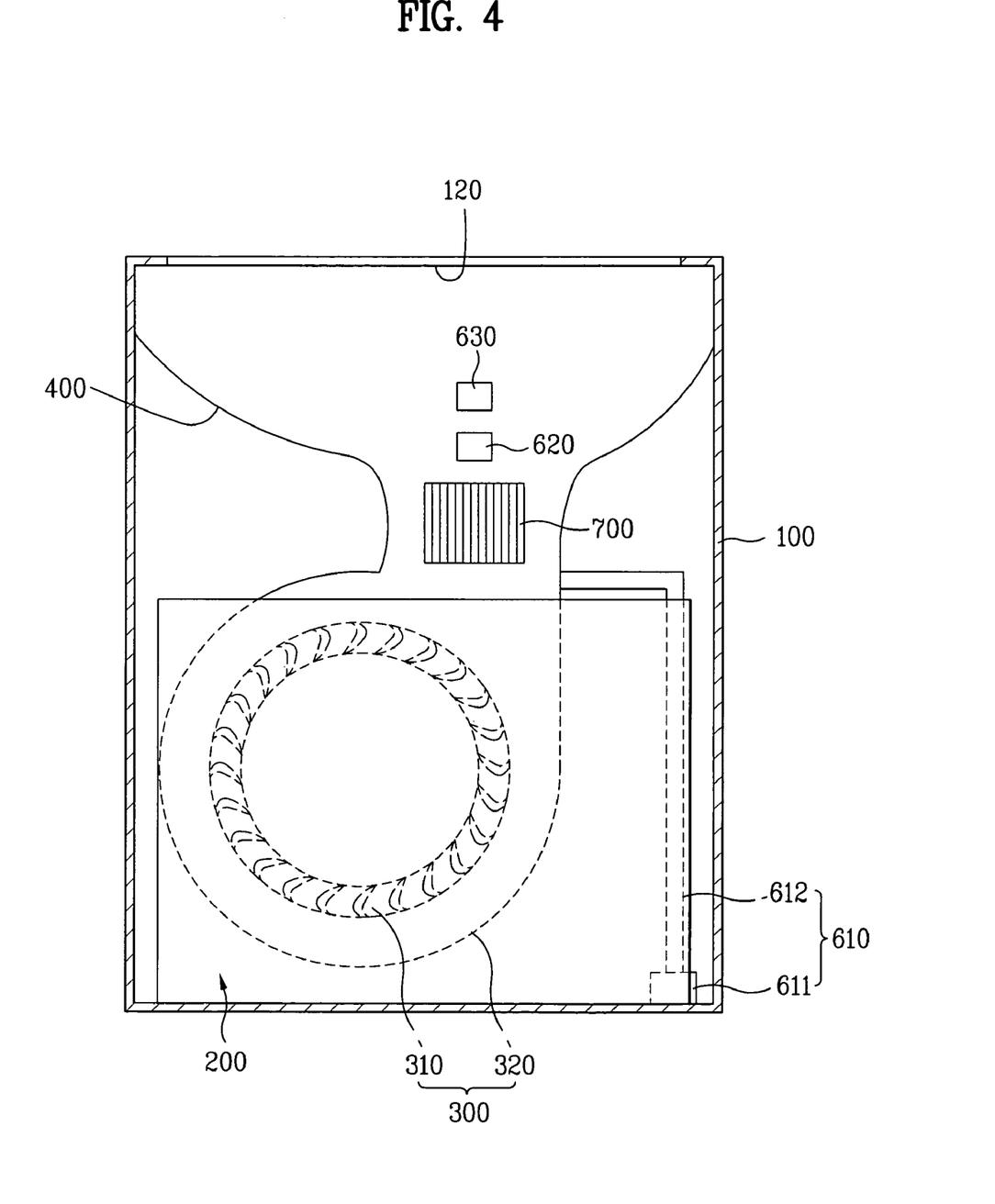
FIG. 4 is a cross-sectional view taken along line I–I' of FIG. 3.

Referring to FIG. 3 and FIG. 4, the air cleaner according to the present invention is provided with a cabinet 100, a filter assembly 200, a fan 310, a sensor assembly 500, a supplier assembly 600, and a controller 800.

Herein, the cabinet 100 forms the exterior of the air cleaner. The cabinet 100 is provided with an inlet 110 and an outlet 120. At this time, a room air is drawn into the inside of the cabinet 100 through the inlet 110, and a cleaned air is discharged to a room through the outlet 120. For example, as shown in FIG. 3, the inlet 110 is provided in a lower front part of the cabinet 100, and the outlet 120 is provided in an upper rear part of the cabinet 100.

However, the inlet 110 and the outlet 120 may be provided in other places. For example, the inlet 110 may be provided in a central front part or an upper part of the cabinet 100, and may be provided in both sides of the cabinet 100. Also, the outlet 120 may be provided in a central upper part or a front part of the cabinet 100, and may be provided in both sides of the cabinet 100.

Meanwhile, the outlet 120 is provided with a plurality of louvers 121. In case the louvers 121 are provided in the outlet 120, a user can easily change a discharge direction of the cleaned air.

The filter assembly 200 is provided inside the cabinet 100 near to the inlet 110. The filter assembly 200 is provided with a first filter 210 and a second filter 220. At this time, the first filter 210 is provided near to the inlet 110 so as to remove dust from the room air flowing into the inside of the cabinet 100 through the inlet 110. Also, the second filter 220 is provided in the rear of the first filter 210, for removing fine dust and smell particles from the air passing through the first filter 210.

The fan 310 is provided inside the cabinet 100 between the filter assembly 200 and the outlet 120. The fan 310 draws the room air through the inlet 110, and discharges the cleaned air through the outlet 120. For example, the fan 310 is formed of a sirocco fan that draws the air in an axis direction, and discharges the air in a circular direction. In addition, it is preferable to provide the fan 310 having a variable rotation speed. The fan 310 forms the fan assembly 300 with the fan housing 320 surrounding the circumference of the fan 310. Also, a guide 400 is provided between the fan assembly 300 and the outlet 120 so as to guide the air discharged from the fan 310 to the outlet 120.

Meanwhile, the sensor assembly 500 is provided inside the cabinet 100 in order to sense the composition of the air drawn into the inside of the cabinet 100 through the inlet 110. The sensor assembly 500 is formed of at least one of a first sensor 510, a second sensor 520, a third sensor 530 and a fourth sensor 540. At this time, the first sensor 510 serves as a sensor for measuring the oxygen content, and the second sensor 520 serves as a sensor for measuring a temperature of the room air. Also, the third sensor 530 measures the dust content of the room air, and the fourth sensor 540 measures the gas content of the room air. Preferably, the fourth sensor 540 measures the content of at least one of carbon monoxide $CO_2$ and nitride oxide $NO_x$. In addition, the fourth sensor 540 may be provided to measure the content of harmful gases or anion.

In the air cleaner according to the present invention, the sensor assembly 500 may comprise a fifth sensor 550 additionally. At this time, the fifth sensor 550 is a sensor for measuring the humidity of the room air. The sensor assembly 500 is provided on a passage of the air flowing within the cabinet 100. Herein, the passage of the air means all spaces through which the air passes from the inlet 110 to the outlet 120.

However, as shown in FIG. 3, it is preferable to provide the sensor assembly 500 between the inlet 110 and the filter assembly 200. The sensor assembly 500 senses the composition of the air before cleaning the air by the filter assembly 200, so that it is possible to obtain correct data regarding the component of the air necessary for the room air.

The supplier assembly 600 is provided on a passage of the air flowing within the cabinet 100. The supplier assembly 600 provides at least one insufficient component of the room air, such as the oxygen, to the air cleaned by the filter assembly 200.

The supplier assembly 600 is provided with a first supplier 610 providing the oxygen to the cleaned air. Then, the first supplier 610 is provided with a container 611 storing the oxygen, and a tube 612 connected with the container 611. At this time, the container 611 may be provided for charging the oxygen therein, and may be provided for being fixed to the cabinet 100 or separated therefrom. That is, when the user consumes the oxygen, the user exchanges the container 611 with new one, thereby obtaining user's convenience. Meanwhile, as shown in FIG. 3, one end of the tube 612 is provided on a passage of the flowing air, whereby the oxygen stored in the container 611 is provided to the cleaned air.

Additionally, the supplier assembly 600 may have a second supplier 620 for providing the anion to the cleaned air. Herein, the anion neutralizes the harmful cation contained in the air, and the anion has helpful effect on a human body. For example, the anion neutralizes and precipitates substances forming the cation such as sulfur dioxide, nitride oxide or carbon monoxide contained in the air, whereby the air is cleaned. Also, the anion relaxes the body, purifies the blood of the human body, and activates cells of the body.

Furthermore, the supplier assembly 600 may have a third supplier 630 for providing terpene to the cleaned air, in which the terpene is the main component of phytoncide. Herein, trees generate the phytoncide that is aromatic chemical material having sterilization and insecticidal characteristics so as to protect themselves from microbe such as bacteria and insects. The phytoncide has the following advantageous characteristics: sterilization, secernent of skin waste material, strengthening of the heart and lung functions, and relaxation of mind and body by stimulating autonomic nerve. Accordingly, if the people breathe in the air containing the terpene, it has helpful effects according to an aromatic forest-bath.

The supplier assembly 600 may be provided inside the cabinet 100 on the passage of the flowing air. However, as shown in FIG. 3, it is preferable to provide the supplier assembly 600 between the fan 310 and the outlet 120.

The controller 800 controls the supplier assembly 600 on the basis of data analyzing the composition of the air sensed in the sensor assembly 500. For example, in case the room air drawn into the inside of the cabinet 100 has insufficient oxygen, the controller 800 operates the first supplier 610 so as to provide the oxygen to the cleaned air discharged through the outlet 120. Also, if the room air drawn into the inside of the cabinet 100 has insufficient anion, the controller 80 operates the second supplier 620 so as to provide the anion to the air. Also, the controller 800 may provide the terpene to the cleaned air by controlling the third supplier 630.

Meanwhile, the air cleaner according to the present invention may have a cooling/heating device 700 additionally. The cooling/heating device 700 is operated to cool or heat the air cleaned inside the cabinet 100, whereby the cleaned air is maintained and provided at an optimum temperature.

In the air cleaning according to the present invention, the cooling/heating device 70 is formed of a thermoelectric module. The thermoelectric module will be described in brief.

When a current is applied to the thermoelectric module, the thermoelectric module has a low temperature part absorbing an ambient heat, and a high temperature part emitting a heat to the circumference according to a peltier effect. As the amount of the current applied to the thermoelectric module is varied, the amount of heat-exchange is varied between the low temperature part and the high temperature part. Also, when the direction of the current applied to the thermoelectric module is changed, the low temperature part turns to the high temperature part, and the high temperature part turns to the low temperature part.

The thermoelectric module has no mechanical operation parts, noise and vibration. Furthermore, it is possible for the thermoelectric module to perform the cooling and heating processes at a high speed, and to control a temperature therein. In addition, the thermoelectric module has miniaturization and lightness in weight. In this respect, the air cleaner according to the present invention adopts the thermoelectric module as the cooling/heating device 700.

The cooling/heating device 700 is provided inside the cabinet 100. At this time, in case of that a first side 710 of the thermoelectric module for absorbing the heat is provided for being in contact with the cleaned air, a second side 720 of the thermoelectric module for emitting the heat is provided not to be in contact with the cleaner air. Meanwhile, in case of that the first side 710 of the thermoelectric module for emitting the heat is provided for being in contact with the cleaned air, the second side 720 of the thermoelectric module for absorbing the heat is provided not to be in contact with the cleaned air. The cooling/heating device 700 is controlled by the controller 800.

Figure 5:
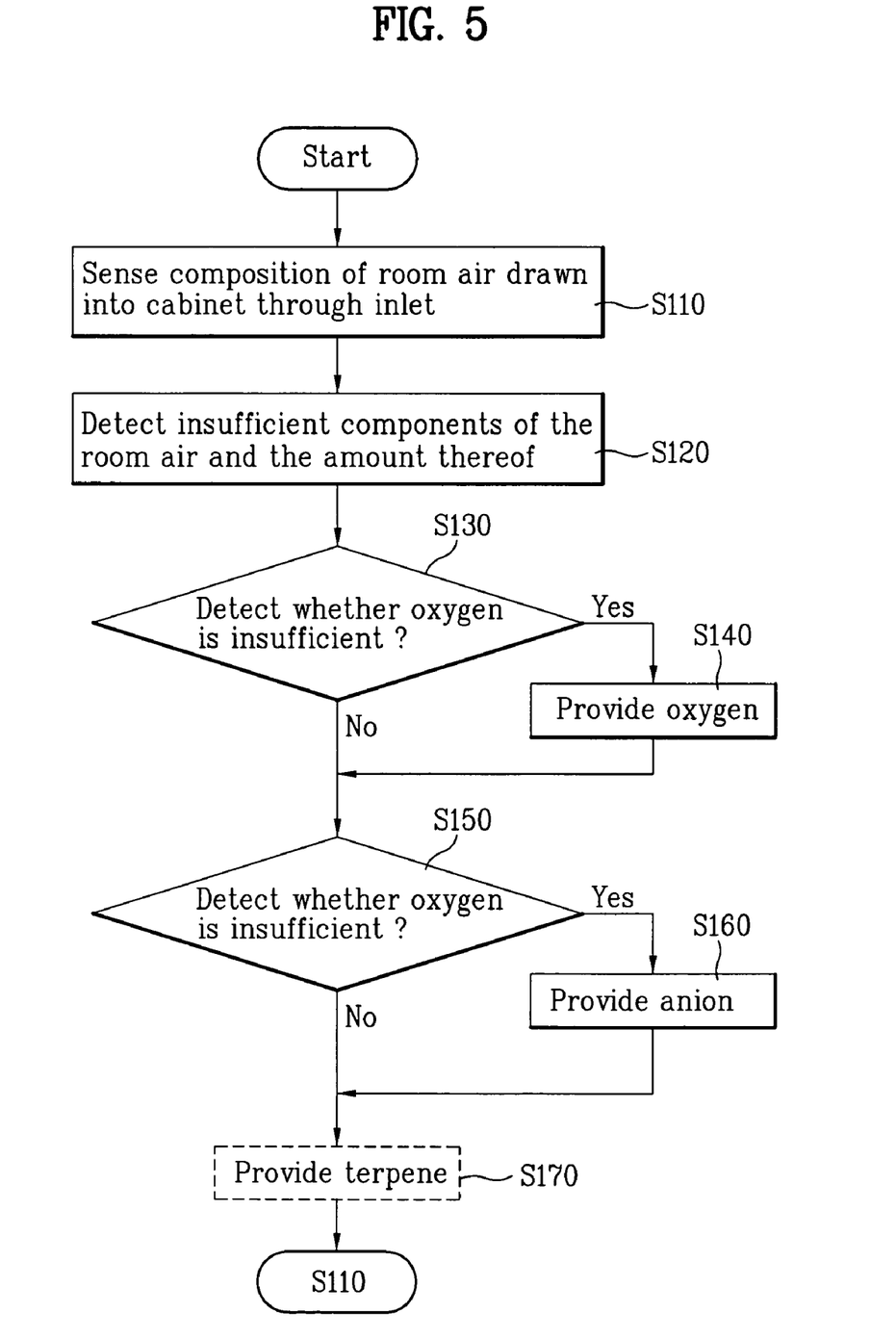
FIG. 5 is a flow chart illustrating a method of controlling an operation of an air cleaner considering insufficient components of a room air.

Hereinafter, a method of controlling an operation of the aforementioned air cleaner according to the present invention will be described with reference to FIG. 5. Herein, FIG. 5 is a flow chart illustrating a method of controlling an operation of the air cleaner considering insufficient components of a room air.

On operating the air cleaner, the fan 310 is rotated, whereby the fan 310 draws the room air into the inside of the cabinet 100 through the inlet 110. Then, the sensor assembly 500 senses the room air (S110), and transmits the data to the controller 800. For example, the data transmitted to the controller 800 includes at least one of the oxygen content and the anion content in the room air. In addition, the data may include information regarding the dust content, the gas content, and the temperature and the humidity of the room air.

After the air passes through the sensor assembly 500, the air flows into the filter assembly 200. At this time, the first filter 210 removes the dust from the flowing air, and the second filter 220 removes the fine dust and the gas such as the smell particles from the air passing through the first filter 210. Subsequently, the air cleaned by the filter assembly 200 is guided to the outlet 120 through the fan 310.

Meanwhile, the controller 80 receives the data having the information regarding to the composition of the room air from the sensor assembly 500, and compares the received data with previously inputted data, thereby calculating the insufficient component of the room air and the content thereof (S120). At this time, the previously inputted data is set within a range of the content helpful to the human body. In this case, the user may input the data previously and optionally through a controller panel (not shown).

After the controller 800 analyzes the composition of the room air, the controller 80 detects the insufficient components of the room air (S130, S150). Then, the controller 800 controls the supplier assembly 600 so as to provide at least one of the insufficient components of the room air to the air flowing to the outlet 120 (S140, S160). Hereinafter, this process step will be described in more detail.

For example, if it is detected that the oxygen content of the room air is below 20.5%, the average density of urban area (S130), the controller 800 operates the first supplier 610 so as to provide the oxygen to the air flowing to the outlet 120 until the oxygen content becomes about 20.5% or more (preferably, about 21.5%). Also, if it is detected that the anion content of the room air is below $350/cm^3$, the average density of urban area (S150), the controller 800 operates the second supplier 620 so as to provide the anion to the air flowing to the outlet 120 until the anion content becomes about $350/cm^3$ or more (S160).

Preferably, the sensor assembly 500 may include a sensor for sensing the anion content of the room air so as to control the second supplier 620 on the basis of the insufficient amount of the anion. Herein, the fourth sensor 540 of measuring the gas content may serve as the sensor for sensing the anion content, or an additional sensor may be provided so as to sense the anion content. If there is no sensor for sensing the anion content of the room air, the controller 800 periodically operates the second supplier 620.

Meanwhile, the controller 800 controls the third supplier 630 so as to provide the terpene to the cleaned air flowing to the outlet 120 (S170). At this time, it is possible to provide the terpene to the cleaned air periodically during operating the air cleaner. Or, the third supplier 640 may provide the terpene to the cleaned air in case it is detected that the terpene is insufficient for the room air.

According to these steps, it is possible to provide at least one of the insufficient components of the room air to the cleaned air by the supplier assembly 600. Then, the cleaned air, to which at least one of the insufficient components of the room air is provided, is discharged to the room through the outlet 120. Accordingly, the cleaned air provides the oxygen, the anion or the terpene in a sufficient amount, thereby obtaining the optimum and comfortable room environment.

Furthermore, a method of controlling an operation of the air cleaner is provided considering of the dust content and the gas content. This method will be described with reference to FIG. 6.

Figure 6:
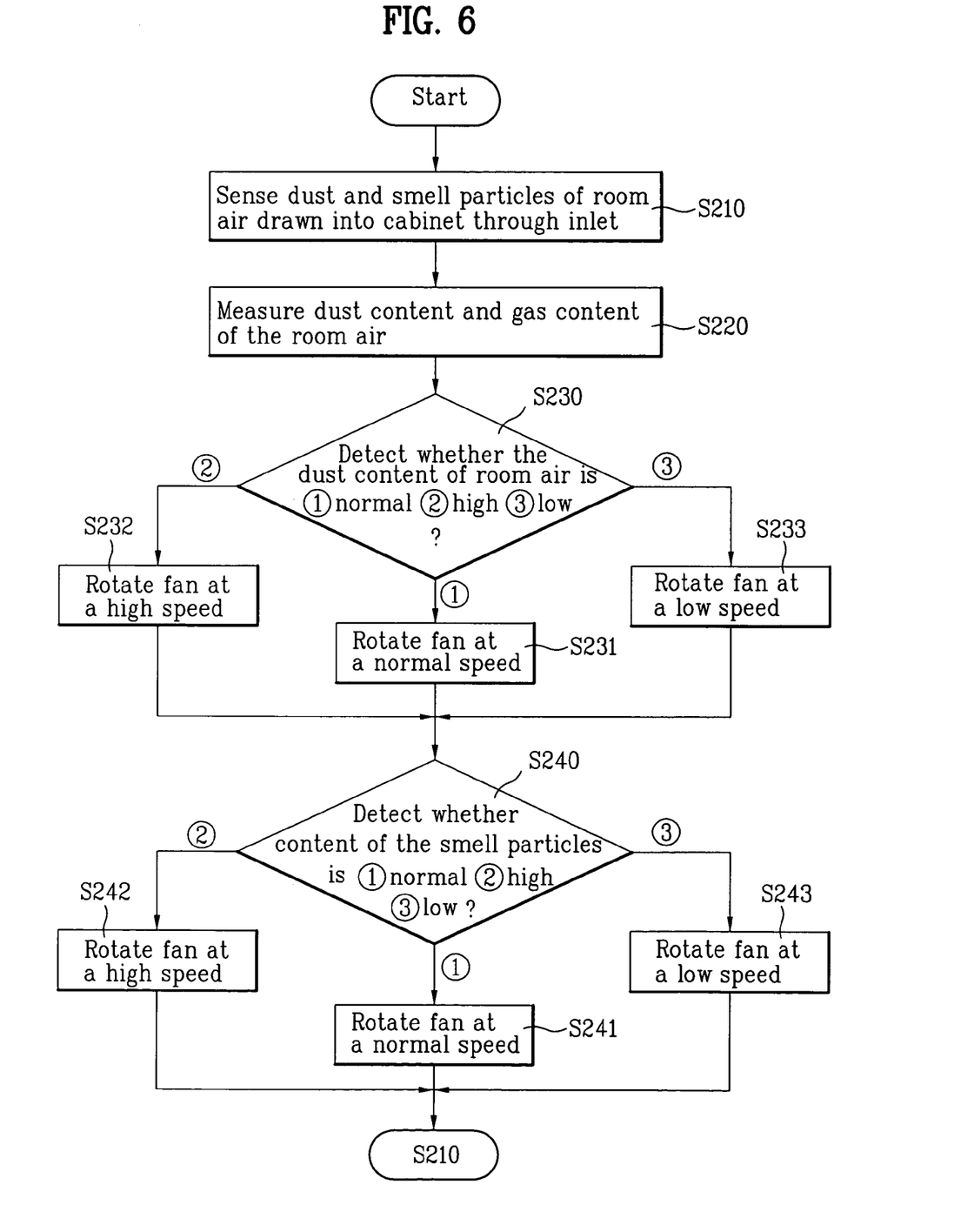
FIG. 6 is a flow chart illustrating a method of controlling an operation of an air cleaner considering a gas content and a dust content in a room air.

Referring to FIG. 6, the controller 800 controls the rotation speed of the fan 310 considering of the gas content, the dust and the smell particles. Accordingly, the method described in FIG. 6 may be performed with the method described in FIG. 5 simultaneously. Hereinafter, this method will be described in detail.

After the sensor assembly 500 senses the dust content and the gas content of the room air (S210), the sensor assembly 500 transmits the information regarding the dust content and the gas content to the controller 800. Then, the controller 80 calculates at least one of the dust content and the gas content contained in the room air on the basis of the data sensed by the sensor assembly 500 (S220).

On completion of calculating the content, the controller 800 compares the result with the previously inputted data, and detects that the dust or gas content of the room air is normal, high (S230), or low (S240). For reference, as shown in FIG. 6, after the controller 800 detects the dust content of the room air, the controller 800 detects the gas content of the room air.

When the dust or gas content of the room air is detected, the controller 800 controls the rotation speed of the fan 310 on the basis of the dust or gas content of the room air. In case the dust or gas content of the room air is above the previously inputted range, the controller 800 rotates the fan 310 at a high speed (S232, S242), whereby the air cleaner cleans the large amount of the air in a short time. Meanwhile, in case the dust or gas content of the room air is within the previously inputted range, the controller 800 rotates the fan 310 at a normal speed (S231, S241). Also, in case the dust or gas content of the room air is below the previously inputted range, the controller 800 rotates the fan 310 at a low speed (S233, S243). In this respect, it is possible to decrease power consumption of the air cleaner.

In the method of controlling the operation of the air cleaner according to the present invention, it is possible to control the rotation speed of the fan 310 on the basis of the dust or gas content of the room air, or both the dust and gas contents of the room air. At this time, if the rotation speed of the fan 310 is controlled on the basis of both the dust and gas contents of the room air, it is preferable to control the rotation speed of the fan 310 according to the large one from the dust and gas contents. In another aspect, it is possible to control the rotation speed of the fan 310 on the basis of the humidity in the room air.

Figure 7:
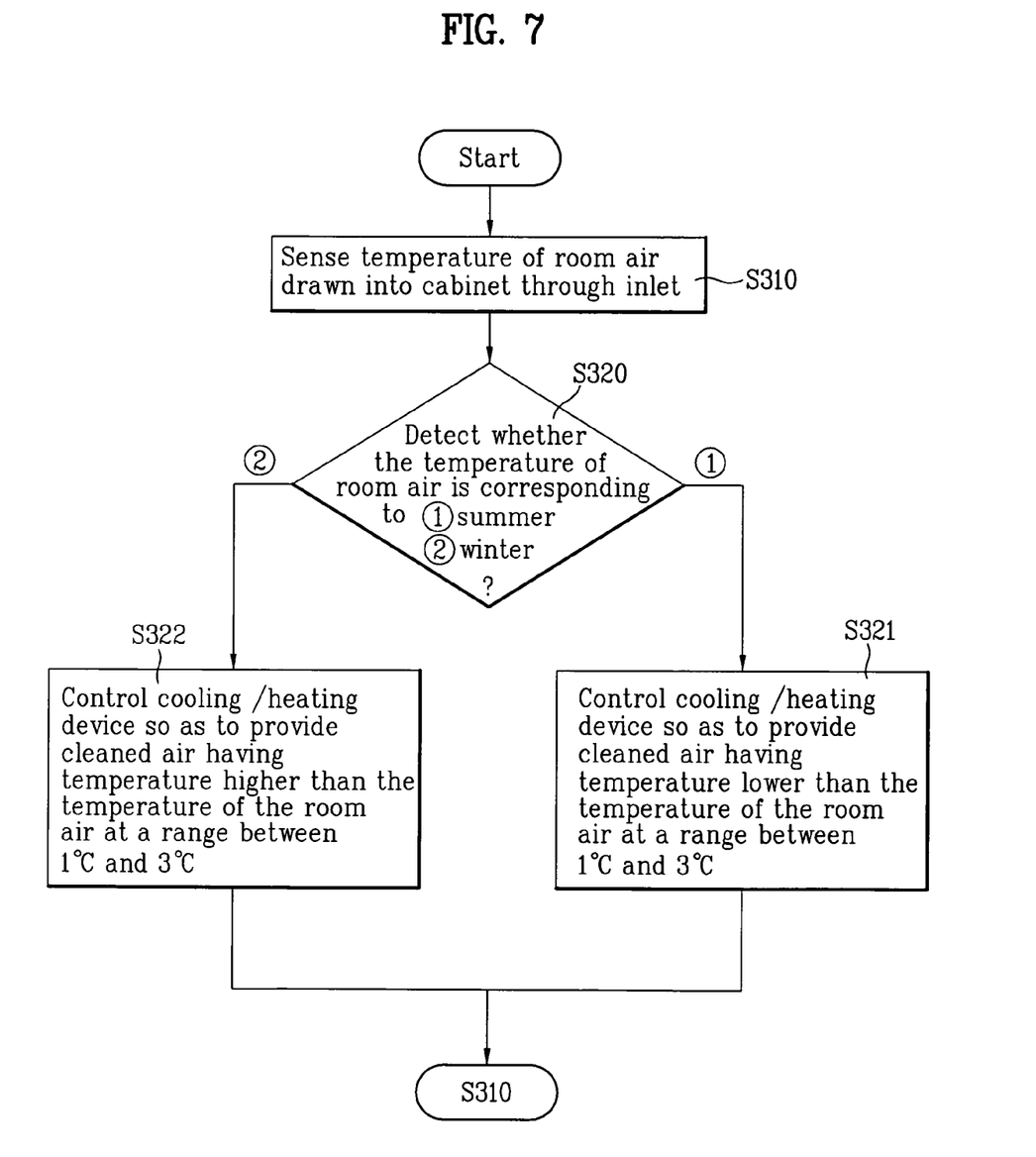
FIG. 7 is a flow chart illustrating a method of controlling an operation of an air cleaner considering a temperature inside a room.

Referring to FIG. 7, a method of controlling an operation of the air cleaner is provided on the basis of the temperature inside the room.

According to the method described in FIG. 7, the controller 800 controls the cooling/heating device 700 on the basis of the temperature inside the room. Accordingly, the method described in FIG. 7 may be performed with the method described in FIG. 5 or FIG. 6, simultaneously. Hereinafter, this method will be described in detail.

The sensor assembly 500 senses the temperature inside the room (S310), and transmits the information regarding the temperature to the controller 800. Subsequently, the controller 800 compares the data regarding the temperature sensed in the sensor assembly 500 with the previously inputted data, and detects the present season (S320). For example, the controller 800 detects that the sensed temperature is within a summer season temperature range or a winter season temperature range on the basis of the previously inputted data. Or, the user may directly select the present season through the controller panel (not shown).

After detecting the present season, the controller 800 controls the direction and amount of the current applied to the cooling/heating device 700 on the basis of the detected season and the present temperature.

For example, if it is detected that the present temperature is corresponding to the summer season on the basis of that the temperature inside the room is about 27° C., the controller 800 controls the cooling/heating device 700 such that the first side 710 of the cooling/heating device 700 absorbs the heat, and the second side 720 of the cooling/heating device 700 emits the heat by controlling the current application direction. After cleaning the air, the intensity of the current is controlled so as to make the temperature of the air heat-exchanged with the first side 710 be lower than the temperature inside the room at a range between 1° C. and 3° C. (preferably, about 2° C.). Thus, the cleaned air discharged through the outlet 120 cools the room, thereby obtaining the optimum temperature inside the room.

If it is detected that the present temperature is corresponding to the winter season on the basis of that the temperature inside the room is about 18° C., the controller 800 controls the cooling/heating device 700 such that the first side 710 of the cooling/heating device 700 emits the heat, and the second side 720 of the cooling/heating device 700 absorbs the heat by controlling the current application direction. After cleaning the air, the intensity of the current is controlled so as to make the temperature of the air heat-exchanged with the first side 710 be higher than the temperature inside the room at a range between 1° C. and 3° C. (preferably, about 2° C.). Thus, the cleaned air discharged through the outlet 120 heats the room, thereby obtaining the optimum temperature inside the room.

As mentioned above, the air cleaner according to the present invention has the following advantages.

First, the air cleaner according to the present invention cleans the room air by removing the dust or the smell particles from the room air. In addition, the air cleaner according to the present invention provides the insufficient components of the room air and the other components having the helpful effect on the human body to the cleaned air, thereby obtaining the optimum indoor environment.

In the air cleaner according to the present invention, it is possible to control the amount of cleaning the air in an hour on the basis of the dust content and the gas content of the room air. That is, in case of the room air is contaminated excessively, the fan is rotated at the high speed, thereby cleaning the room air in a short time. If the room air is not contaminated, the rotation speed of the fan is controlled, thereby decreasing power consumption.

The air cleaner according to the present invention cools or heats the room air on the basis of the humidity or temperature inside the room, thereby improving a user's satisfaction and production reliability by providing the optimum indoor environment to the user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An air cleaner comprising:
    a cabinet including an inlet through which a room air of a room is drawn, and an outlet from which a cleaned air is discharged to the room;
    a filter assembly to remove dust and smell particles from the room air drawn through the inlet;
    a fan located inside the cabinet so as to discharge the room air filtered by the filter assembly to the outlet after drawing the room air;
    a sensor assembly located inside the cabinet so as to sense composition of the room air drawn through the inlet;
    a supplier assembly located inside the cabinet so as to provide at least one of components of the room air to the room air filtered by the filter assembly; and
    a controller for controlling the supplier assembly to supply the at least one of the components of the room air to the room air filtered by the filter assembly when the sensor assembly senses an insufficient amount of the at least one of the components of the room air drawn through the inlet.

2. The air cleaner as claimed in claim 1, wherein the sensor assembly senses the composition of the room air before the air passes through the filter assembly.

3. The air cleaner as claimed in claim 1, wherein the sensor assembly includes at least one of:
    a first sensor measuring an oxygen content of the room air;
    a second sensor measuring a temperature inside the room;
    a third sensor measuring a dust content of the room air; and
    a fourth sensor measuring a gas content of the room air.

4. The air cleaner as claimed in claim 3, wherein the fourth sensor is for measuring at least one of carbon monoxide, $CO_2$ and nitride oxide $NO_x$.

5. The air cleaner as claimed in claim 3, wherein the sensor assembly includes a fifth sensor for measuring the humidity inside the room.

6. The air cleaner as claimed in claim 1, wherein the supplier assembly includes a first supplier for providing oxygen to the room air filtered by the filter assembly.

7. The air cleaner as claimed in claim 6, wherein the supplier assembly includes a second supplier for providing anion to the room air filtered by the filter assembly.

8. The air cleaner as claimed in claim 6, wherein the supplier assembly includes a third supplier for providing terpene to the cleaned air.

9. The air cleaner as claimed in claim 1, further comprising a cooling/heating device located inside the cabinet, so as to cool or heat the cleaned air.

10. The air cleaner as claimed in claim 9, wherein the cooling/heating device is a thermoelectric module.

11. The air cleaner as claimed in claim 10, wherein the thermoelectric module includes:
    a first side having an exothermic or endothermic reaction, and being in contact with the room air filtered by the filter assembly; and
    a second side having an opposite reaction to that of the first side, and not being in contact with the room air filtered by the filter assembly.

12. The air cleaner as claimed in claim 1, wherein the fan has a variable rotation speed.

13. A method of controlling an operation of an air cleaner comprising:
    sensing a room air drawn from a room into the inside of a cabinet through an inlet;

measuring at least one of components of the room air and comparing a sensed amount of the at least one of the components from the sensing step with previously inputted data;

supplying the at least one of the components of the room air to the room air filtered by a filter assembly when the sensed amount is less than the previously inputted data; and guiding the room air filtered by a filter assembly and the supplied at least one of the components of the room air to an outlet by a fan.

14. The method as claimed in claim 13, wherein the step of supplying the at least one of the components of the room air includes supplying at least one of oxygen and anion to the room air filtered by a filter assembly.

15. The method as claimed in claim 13, further comprising a step of supplying terpene to the room air filtered by the filter assembly and guiding the terpene to the outlet by the fan.

16. The method as claimed in claim 13, further comprising steps of:

calculating at least one of a dust content and a gas content of the room air based on a result of the sensing step; and controlling a rotation speed of the fan based on at least one of the dust content and the gas content from the calculating step.

17. The method as claimed in claim 16, wherein the fan is operated at a variable rotation speed including:

a high speed when the dust or gas content of the room air is above a previously inputted range;

a normal speed when the dust or gas content of the room air is within the previously inputted range; and a low speed when the dust or gas content of the room air is below the previously inputted range.

18. The method as claimed in claim 13, further comprising steps of:

detecting whether a temperature of the room air is within a first temperature range or a second temperature range based on previously inputted temperature data; and cooling or heating the air filtered by the filter assembly based on a result of the detecting step.

19. The method as claimed in claim 18, wherein, if it is detected that the room air has a temperature corresponding to the first temperature range, cooling the air to a temperature lower than the temperature of the room air at a range between 1° C. and 3° C.

20. The method as claimed in claim 18, wherein, if it is detected that the room air has a temperature corresponding to the second temperature range, having heating the air to a temperature higher than the temperature of the room air at a range between 1° C. and 3° C.

21. The air cleaner as claimed in claim 1, wherein the filter assembly is located inside the cabinet.

22. The air cleaner as claimed in claim 21, wherein the sensor assembly is located between the inlet and the filter assembly.

23. The air cleaner as claimed in claim 1, wherein the supplier assembly includes an oxygen container for supplying oxygen.

24. The air cleaner as claimed in claim 23, wherein the oxygen container is exchangeable.

25. The air cleaner as claimed in claim 1, wherein the components supplied by the supplier assembly are selected from a group consisting of oxygen, anions and terpene.

26. The air cleaner as claimed in claim 3, wherein the fourth sensor is for detecting an amount of anions in the room air.

27. The method as claimed in claim 14, wherein the step of supplying oxygen includes supplying the oxygen from an oxygen container.

28. The method as claimed in claim 27, wherein the step of supplying the oxygen from the oxygen container includes supplying the oxygen from an exchangeable oxygen container.

29. The method as claimed in claim 13, wherein the components supplied are selected from a group consisting of oxygen, anions and terpene.

* * * * *